March 31, 1970     H. LOFFELHOLZ     3,503,209

HYDRAULIC TORQUE CONVERTER

Filed Aug. 27, 1968     2 Sheets-Sheet 1

INVENTOR
Herbert Löffelholz
By: Low and Berman
Agents

March 31, 1970  H. LOFFELHOLZ  3,503,209
HYDRAULIC TORQUE CONVERTER
Filed Aug. 27, 1968  2 Sheets-Sheet 2

INVENTOR
Herbert Löffelholz
By: Row and Berman
Agents

United States Patent Office 3,503,209
Patented Mar. 31, 1970

3,503,209
HYDRAULIC TORQUE CONVERTER
Herbert Loffelholz, Schweinfurt, Germany, assignor to Fichtel & Sachs A.G., Schweinfurt, Germany
Filed Aug. 27, 1968, Ser. No. 755,541
Claims priority, application Germany, Sept. 2, 1967, 1,650,696
Int. Cl. F16d 33/00; F04d 29/18
U.S. Cl. 60—54          5 Claims

ABSTRACT OF THE DISCLOSURE

The coupling characteristics of an otherwise conventional torque converter are improved when the operating elements of the same satisfy dimensional requirements more fully described in the specification. The torque converter has a relatively small impeller input torque beneficial in automatic transmissions connected to automobile engines of relatively small displacement, and very little slip under normal operating conditions.

BACKGROUND OF THE INVENTION

This invention relates to automatic transmissions for automobile engines and the like, and particularly to improvements in a hydraulic converter of the type basically known, for example, from the French Patent No. 1,422,273.

The performance of such a torque converter is conveniently characterized by its coupling performance under normal operating conditions and by the impeller input torque. The coupling performance is determined by the ratio of the rotary speeds of the turbine and of the impeller under normal operating conditions, that is, when the stator turns with the impeller and turbine so that there is no conversion of torque or speed. Under ideal conditions, the torque converter should behave under these conditions like a fully engaged mechanical clutch, and the rotary speed and the torque transmitted by the impeller should be identical with the speed and transmitted torque of the turbine. Slip causes differences between the rotary speed $n_1$ of the impeller and the rotary speed $n_2$ of the turbine. The coupling performance should approach as closely as possible a value of $n_1/n_2=1$ under the afore-defined normal conditions.

The impeller input torque may be determined by the rotary speed of the impeller achieved when the impeller is driven by an associated standard engine under reproducible conditions, for example, at wide open throttle, while the turbine is held stationary as by the driven vehicle abutting against an immovable object under conditions of adequate friction between the driven wheels and a supporting surface. The impeller speed reached under these conditions is inversely related to the impeller input torque. For vehicles driven by engines of relatively small displacement, such as those of most European cars, a small impeller input torque and a correspondingly high impeller speed at arrested turbine are normally required.

The known hydraulic torque converters achieve a compromise between good coupling performance and low impeller input torque which is not fully satisfactory. The torque converter of the afore-mentioned French patent which is typical of good converter design prior to the instant invention achieves relatively good coupling performance at the cost of relatively high impeller input torque. It operates efficiently only over a relatively narrow range of ratios between the impeller speed and the turbine speed whereas efficiency deteriorates sharply as the speed ratio deviates from its optimum value.

It has been found that the shortcomings of the known torque converter are due to dimensional relationships which affect its hydrodynamic characteristics. The primary object of this invention is the provision of a torque converter of the general type represented by the afore-mentioned French patent, but free of the shortcomings of the same.

SUMMARY OF THE INVENTION

In such a torque converter, the annular cavity of the double-walled hollow torus element constituted by inner and outer wall portions of the impeller, turbine, and stator is divided by the vanes into annular passages about the inner wall of the torus element, sections of each passage being bounded by the vanes of the impeller, turbine, and stator respectively. The passage, in an axial plane, defines a median line which sequentially passes through the several sections.

According to one basic feature of this invention, the ratio between the spacing of the converter axis from the entry point of the median line into the passage section bounded by the impeller vanes and the corresponding spacing of the point of exit of the median line from the same section must be between 0.55 and 0.65.

The ratio between the outer diameter of the cavity and its inner diameter, as measured at right angles to the converter axis, must be greater than 1.8.

The outer and inner walls of the cavity bound a flat circular ring including the afore-mentioned exit point in a plane perpendicular to the converter axis. The area of that ring should be between 0.1 and 0.3 times the area of a circle whose diameter is equal to the afore-mentioned outer diameter.

The ratio of the greatest axial length of the cavity to the outer diameter should be between 0.22 and 0.28, and the ratio of the width of the cavity in the torus element to the outer diameter should be 0.30 to 0.36, the width being measured at right angles to the converter axis.

The afore-mentioned median line inherently forms a closed loop.

In accordance with another basic feature of this invention the continuity equation $$V = 2R_x \pi b_x \cdot c_m = \text{const.}$$

must be fulfilled along the closed loop for a constant value of $c_m$.

In this continuity equation the different symbols have the following meaning:

$V$ is a calculation figure called "flow volume"
$c_m$ is a calculation figure called "meridian velocity"
$R_x$ is the distance of the converter axis from the center of a circle touching the inner and the outer wall of the torus, as regarded in an axial plane.
$b_x$ is the diameter of said circle.

The continuity equation is obviously fulfilled along the flowing loop for a constant value of $c_m$ if the product $b_x R_x$ is constant for all circles which are in an axial plane inscribable to the inner and the outer wall of the torus so as to touch both walls.

Therefore the postulation that the continuity equation should be fulfilled for a constant value of $c_m$ along the flowing loop can in a different phraseology be expressed so as to say that the product $b_x R_x$ must be constant along the flow loop wherein $b_x$ and $R_x$ have the above mentioned meaning.

The torque converter of the invention shown in FIG. 1 simultaneously satisfies the necessary conditions listed above, and therefore combines impeller input torque with coupling performance under normal operating conditions in a more favorable manner than the torque converter of the cited French patent which does not satisfy these dimensional requirements.

As is not novel in itself, the outer wall of the torus element is advantageously shaped in such a manner that it intersects each plane through the converter axis in a closed loop consituted by sequentially joined circular arcs, adjacent arcs having a common tangent at the point of juncture while having radii of different length. It has now been found that the ratio between the longest and the shortest of these radii should not exceed 3.5, preferably be less than 3.0, and best be smaller than 2.7.

Other features, additional objects, and many of the attendant advantages of this invention will readily be appreciated as the same becomes better understood by reference to the following detailed description of a preferred embodiment when considered in connection with the appended drawing.

DESCRIPTION OF THE PREFERRED EMBODIMENT

Figure 1:
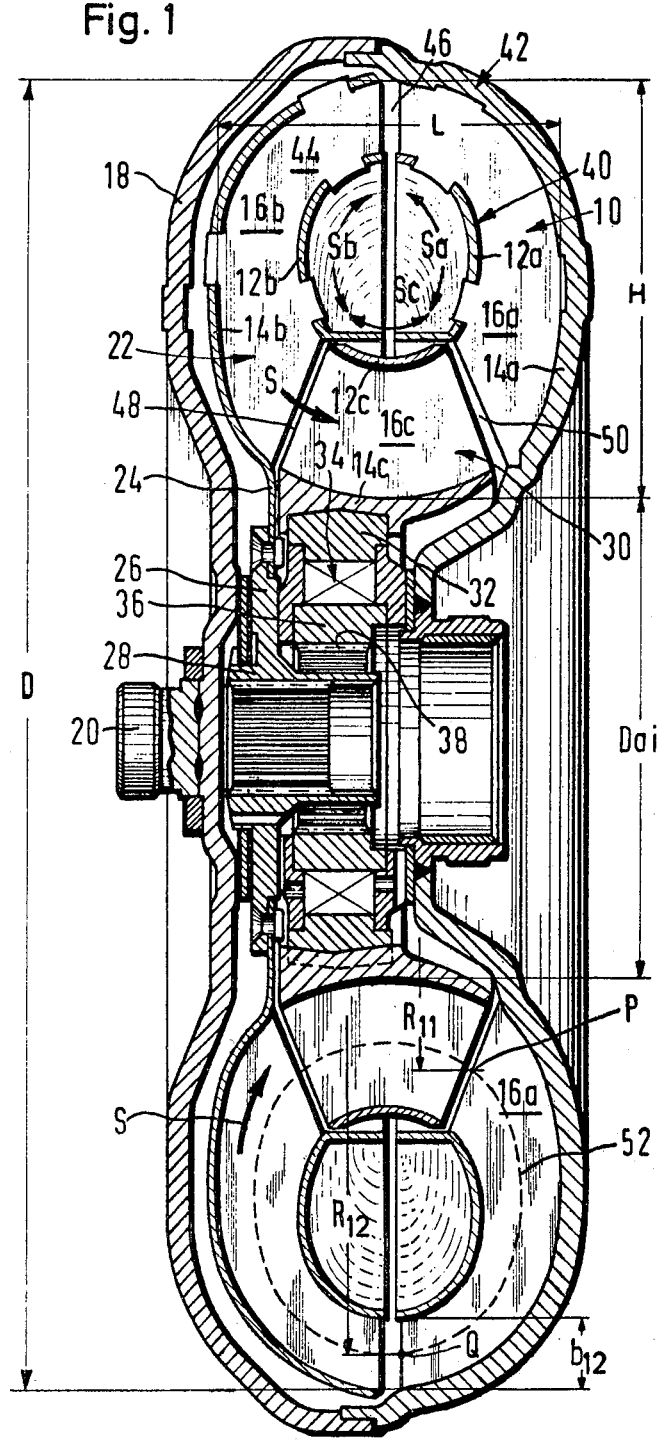
FIG. 1 shows a hydraulic torque converter of the invention in axial section.

Referring initially to FIG. 1, there is seen a hydraulic torque converter of a generally known type. Its impeller 10 has an inner wall portion 12a, an outer wall portion 14a, and vanes 16a, which connect the inner and outer wall portions. The outer wall portion 14a forms the main portion of the converter casing which is closed by a disc 18 attached to the inverter input diagrammatically shown as a shaft 20 and serving as a flywheel of an associated engine, not itself shown.

The turbine 22 of the converter axially faces the impeller 10 and has an inner wall portion 12b, an outer wall portion 14b, and connecting vanes 16b. The turbine is attached by connecting flanges 24, 26 to an internally splined hub 28 which is an element of the output shaft assembly of the converter, not otherwise shown.

The stator 30 is axially interposed between the impeller 10 and the turbine 22 near the converter axis. It has an inner wall portion 12c, an outer wall portion 14c, and connecting vanes 16c. It is mounted on the outer sleeve 32 of an overrunning clutch 34 whose inner sleeve 36 is normally connected to a stationary body by splines 38.

The inner wall portions 12a, 12b, 12c jointly constitute the approximately toroidal inner wall 40, and the outer wall portions 14a, 14b, 14c jointly constitute the approximately toroidal outer wall 42 of a double-walled, hollow torus element 44 centered in the torque converter axis, and of uniform cross section in all axial planes.

The walls 40, 42 also define an annular passage S about the inner wall 40 between the vane portions 16a, 16b, 16c in the axial plane of FIG. 1. The pasage has three sections $S_a$, $S_b$, $S_c$ which are respectively bounded by the vanes 16a, 16b, 16c and are separated from each other by narrow gaps 46, 48, 50 between the sections. The median line 52 defined by the passage S in the view of FIG. 1 sequentially passes through the three sections in a closed loop. The annular cavity of the torus element 44 between the inner and outer walls 40, 42 has an axial length L which is substantially smaller than its width H measured at right angles to the torque converter axis.

The surface of the outer wall 42 in the cavity of the element 44 has an outer diameter D and an inner diameter $D_{a1}$. The median line 52 enters the section $S_a$ in the direction of normal fluid flow from the section $S_c$ at a point P, and leaves the section $S_a$ at a point Q. The spacings of the entry and exit points P, Q from the converter axis are $R_{11}$ and $R_{12}$ respectively. The flat circular ring which extends in a radial plane through the point Q between the walls 40, 42 has a width $b_{12}$.

Figure 2:
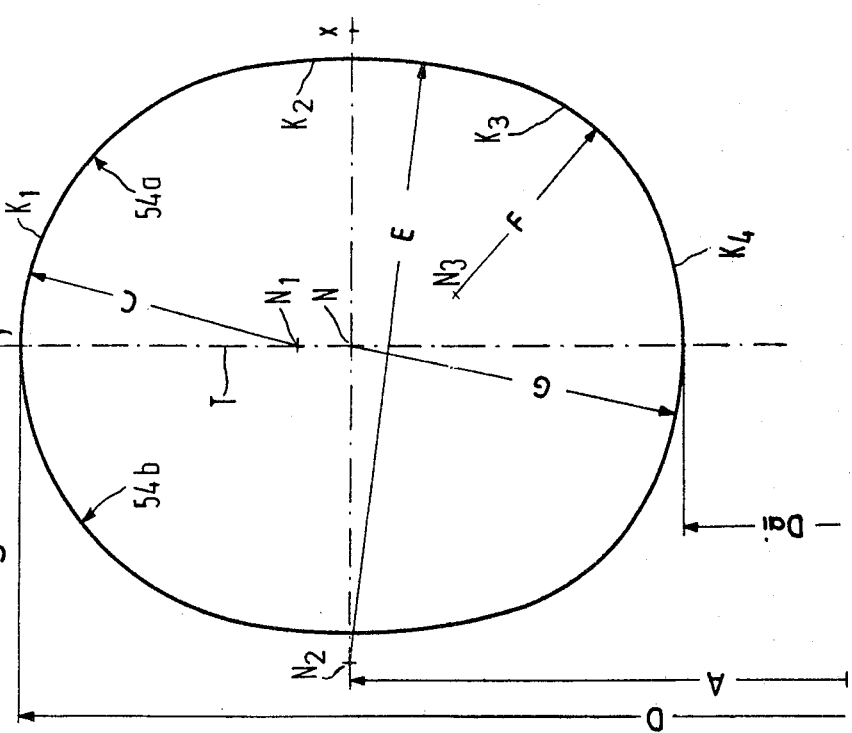
FIG. 2 illustrates dimensional relationships in a portion of the apparatus of FIG. 1.

FIG. 1 is drawn substantially to scale, and the several dimensions indicated satisfy the conditions pointed out above as being essential to this invention. Additional dimensional relationships in the plane of FIG. 1 are illustrated in FIG. 2.

The inner surface of the outer wall 42 which encloses the cavity of the torus element 44 forms a closed, oblong curve or loop whose area is centered in a point N spaced from the converter axis along a radius T by a distance A equal to 0.34 times D, the outer diameter of the cavity in the torus element 44. The oblong curve or loop which represents the wall 42 in FIG. 2 has two halves 54a, 54b, symmetrical relative to the radius T. The curve 54a is constituted by four, sequentially joined, circular arcs or curve portions $K_1$, $K_2$, $K_3$, $K_4$ centered in the points $N_1$, $N_2$, $N_3$, and N, whose radii C, E, F, G, are different in length. Each pair of adjacent arcs has a common tangent at the point of juncture. The general requirements for the length of these radii have been set forth above. In the preferred embodiment of the invention illustrated in FIG. 2, the arcs are defined by the data listed in the following table, the locations of the centers of curvature being indicated in a system of rectangular Cartesian coordinates whose Y-axis coincides with the radius T, and whose X-axis intersects the Y-axis in the point N. The unit of length in the table is D, the outer diameter of the cavity in the torus element 44.

TABLE

| Curve Portion | Length of radius | Center of arc | |
|---|---|---|---|
| | | X | Y |
| $K_1$ | 0.14 | 0 | 0.025 |
| $K_2$ | 0.29 | −0.15 | 0 |
| $K_3$ | 0.11 | 0.018 | −0.048 |
| $K_4$ | 0.16 | 0 | 0 |

The above definition of the inner surface of the outer wall 42 by Cartesian coordinates was introduced for simplification, it does, however, not correspond to the proceeding of the designer when designing such an inner surface. A designer would design one of the two symmetrical halves of the curve as regarded in FIG. 2 as follows:

(1) Starting from the converter axis (not shown) a first line parallel to the converter axis is drawn a distance $D/2$.

(2) Starting from the converter axis (not shown) a second line parallel to the converter axis is drawn in a distance $A=0.34D$ (X-axis).

(3) Starting from the converter axis (not shown) a third line parallel to the converter axis is drawn in a distance 0.29 D.

(4) A fourth line normal to the converter axis is drawn (Y-axis).

(5) The center $N_1$ of the circle $K_1$ is fixed on said fourth line in a distance $C=0.14D$ from said first line.

(6) The circle $K_1$ is drawn around the center $N_1$ with a radius $C=0.14D$.

(7) The center $N_2$ of the circle $K_2$ is fixed by finding the intersection point of said second line with an auxiliary circle drawn around the center $N_1$ with aradius $E-C=0.15D$.

(8) The circle $K_2$ is drawn around the center $N_2$ with the radius $E=0.29D$.

(9) The center $N_3$ of the circle $K_3$ is fixed by finding the intersection point of said third line with a circle drawn around the center $N_2$ with a radius $E-F=0.18D$.

(10) The circle $K_3$ is drawn around the center $N_3$ with the radius $F=0.11D$.

(11) The center N is fixed by the intersection point of said fourth line (Y-axis) with said second line.

(12) The circle $K_4$ is drawn around the center N with the radius $G=0.16D$.

In FIG. 1 there are shown a distance $R_{12}$ from the converter axis and an associated distance $b_{12}$ between the inner wall 40 and the outerwall 42. These distances $R_{12}$ and $b_{12}$ correspond to $R_x$ and $b_x$ as defined in the specification and claims for a definite circle, whose center is positioned in Q.

Figure 3:
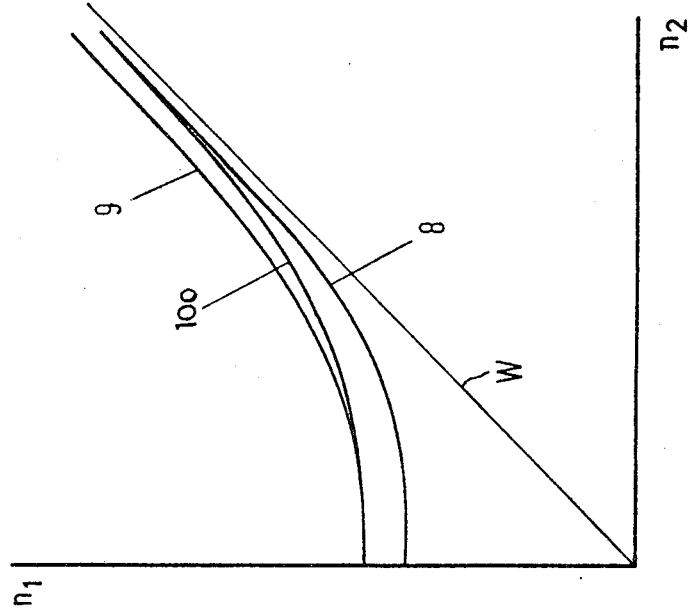
FIG. 3 graphically illustrates the performance of the apparatus of FIG. 1 and similarly shows the performance of torque converters lacking features of this invention.

FIG. 3 graphically illustrates the characteristics of the hydraulic torque converter shown in FIGS. 1 and 2, and also shows the performance of known similar converters by way of comparison.

The graph of FIG. 3 is a plot of a rotary impeller speeds $n_1$ v. rotary turbine speeds $n_2$ in consistent arbitrary units. The curve 100 represents data derived from the torque converter of the invention for a value of $D=244$ mm., and other dimensions satisfying the requirements listed above. The curve 8 represents values obtained from an otherwise similar torque converter whose torus element has an outer wall of circular cross section in an axial plane, and having an outer diameter of 244 mm. The torque converter from which the data of curve 9 was derived differs from that of curve 8 by an outer diameter of 220 mm.

The several curves were obtained by connecting the input shafts of the several converters to the crankshaft of the same engine which was then operated at full throttle. The first reading of impeller speed $n_1$ was taken with the turbine arrested by means of a brake ($n_2=0$) and is indicative of the impeller input torque. The brake was then released gradually and simultaneous values $n_1$, $n_2$ were taken in various brake positions.

The torque converter which furnished the data for curve 8 operates at relatively low impeller speed $n_1$, when $n_2=0$, and therefore has a high impeller input torque undesirable in a motor-car equipped with a relatively weak engine. The curve 8 rather quickly approaches a line W as the turbine speed increases. The line W bisects the angle between the coordinates $n_1$ and $n_2$ and thus represents the ideal coupling performance under normal operating conditions corresponding to $n_1=n_2$, or zero slip.

The torque converter represented by the line 9 has a more desirable high impeller speed $n_1$ when its turbine is blocked, and thus a low impeller input torque. However, it approaches the line W much more slowly than the line 8, and has a less desirable coupling performance.

The corresponding characteristic line 100 of the torque converter of the invention has little slip under normal operating conditions, as indicated by the rapid approach of the curve 100 to the line W while having a desirably high impeller speed at a value of $n_2=0$, and a correspondingly low impeller input torque. The torque converter of the invention thus combines the favorable properties of the two converters represented in FIG. 3 by curves 8 and 9 while avoiding the unfavorable features of either.

Because of its relatively small axial length, the torque converter of the invention is further advantageous in a compact or even smaller car in which the length available for an automatic transmission is severely limited.

What is claimed is:

1. In a hydraulic converter having an impeller member (10), a turbine member (22), and a stator member (30), said torque converter having an axis and said members being annular about said axis, said impeller and turbine members facing each other in an axial direction, and said stator member being interposed axially between said impeller and turbine members, input shaft means (20) coupled to said impeller member (10), output shaft means (28) coupled to said turbine member (22), overrunning clutch means (34) for coupling said stator member (30) to a stationary body, said members having respective inner wall portions (12a, 12b, 12c) jointly constituting an approximately toroidal inner wall (40) of a hollow, double-walled torus element (44), respective outer wall portions (14a, 144b, 14c) jointly constituting an approximately toroidal outer wall (42) of said element (44) and spacedly receiving said inner wall (40) therein, and respective vane portions (16a, 16b, 16c) connecting said inner and outer wall portions, said element (44) being centered in said axis and of uniform crossection in all axial planes, said walls (40, 42) defining an annular passage (S) about said inner wall (40) between said vane portions (16a, 16b, 16c) in an axial plane through said axis, respective sections ($S_a$, $S_b$, $S_c$) of said passage being bounded by the vane portions of said members (10, 22, 30) and separated from each other by narrow gaps (46, 48, 50) between the associated vane portions, said passage (S) defining an annular median line (52) sequentially passing through said sections, the annular cavity of said element (44) between the inner and the outer walls (40, 42) thereof having an axial length (L) and a width (H) measured at right angles to said axis, the improvement which comprises:

(a) the ratio between the spacing ($R_{11}$) of the point of entry (P) of said median line (52) into the section ($S_a$) bounded by the vane portions (16a) of said impeller member (10) from said axis and the corresponding spacing ($R_{12}$) of the point of exit (Q) of said median line from said last-mentioned section being between 0.55 and 0.65;

(b) the ratio of the outer diameter (D) of the cavity in said element (44) to the inner diameter ($D_{ai}$) thereof being greater than 1.8, said diameters being measured from said axis and at right angles thereto;

(c) the area of the circular ring defined between said inner wall (440) and said outer wall (42) in a plane perpendicular to said axis and including said point of exit (Q) being 0.1 to 0.3 times the area of a circle having the same diameter as said outer diameter (D) of said cavity in said element (44);

(d) the ratio of said axial length (L) of said cavity to said outer diameter (D) thereof being 0.22 to 0.28;

(e) the ratio of said width (H) of said cavity to said outer diameter (D) thereof being 0.30 to 0.36;

(f) said median line (52) constituting a closed continuously convexly curved loop when viewed from the outside; and (g) the product $R_x b_x$ is constant for all circles which are in an axial plane inscribable between the inner wall (40) and the outer wall (42) so as to touch both walls wherein $R_x$ is the distance of the center of each circle from the converter axis and $b_x$ is the diameter of that circle.

2. In a torque converter as set forth in claim 1, said outer wall (42) intersecting a plane through said axis in a closed loop constituted by a plurality of sequentially joined circular arcs ($K_1$, $K_2$, $K_3$, $K_4$) adjacent arcs having a common tangent at the point of juncture, and radii (C, E, F, G) of different length.

3. In a torque converter as set forth in claim 2, the ratio of the longest of said radii (E) to the shortest of said radii (F) being smaller than 3.0.

4. In a torque converter as set forth in claim 3, the ratio of said longest and shortest radii (E, F) being smaller than 2.7.

5. In a torque converter as set forth in claim 2, said arcs ($K_1$, $K_2$, $K_3$, $K_4$) constituting two curves (54a, 54b) symmetrical relative to a radius (T) perpendicular to said axis in said plane and enclosing an area centered in a point (N) on said radius (T), the spacing (A) of said last-mentioned point (N) from said axis being 0.34 times said outer diameter (D) of said cavity in said element (44) and one of said symmetrical curves (54a, 54b) being constituted by circular portions, $K_1$, $K_2$, $K_3$, and $K_4$ defined by the following table in a system of rectangular Cartesian coordinates having a Y-axis coinciding with said last mentioned radius (T) and an X-axis intersecting said Y-axis in said last-mentioned point (N), the unit of length in said table being said outer diameter (D) of the cavity in said element (44).

TABLE

| Curve Portion | Length of radius | Center of arc | |
|---|---|---|---|
| | | X | Y |
| K₁ | 0.14 | 0 | 0.025 |
| K₂ | 0.29 | −0.15 | 0 |
| K₃ | 0.11 | 0.018 | −0.048 |
| K₄ | 0.16 | 0 | 0 |

References Cited
UNITED STATES PATENTS

| | | | |
|---|---|---|---|
| 2,306,758 | 12/1942 | Schneider et al. | 60—54 |
| 2,961,830 | 11/1960 | Dundore et al. | 60—54 |
| 3,071,928 | 1/1963 | Dundore et al. | 60—54 |
| 3,192,719 | 7/1965 | Kronogard | 60—54 |

EDGAR W. GEOGHEGAN, Primary Examiner

U.S. Cl. X.R.

103—115